March 14, 1933.    F. ROBBINS    1,901,042
FRUIT PITTING MACHINE
Filed Jan. 19, 1927    6 Sheets-Sheet 1

FIG. 1.

INVENTOR
Frank Robbins
BY White, Prost & Fryer
his ATTORNEYS

FIG_4_

FIG_5_

Patented Mar. 14, 1933                                                                                    1,901,042

UNITED STATES PATENT OFFICE

FRANK ROBBINS, OF SACRAMENTO, CALIFORNIA, ASSIGNOR OF ONE-HALF TO LIBBY, McNEILL & LIBBY, OF SAN FRANCISCO, CALIFORNIA, A CORPORATION OF MAINE

FRUIT PITTING MACHINE

Application filed January 19, 1927. Serial No. 161,986.

My invention relates to machines for removing the pits from fruit and relates especially to machines of the type in which the entire fruit and pit are first bisected and the divided pit is then removed from the separated portions of the fruit.

The machine of my invention is useful in a number of different ways and with a variety of fruit but is especially applicable to the pitting of peaches.

A peach is roughly symmetrical about a central plane extending thru the pit and the flesh portion of the fruit. This plane is indicated on the exterior of the peach by a groove or line, called the suture, which extends around one side of the fruit from the stem end depression to the peak at the flower end. In dividing the peach into two portions to facilitate the removal of the pit, it is advisable to have the plane of cleavage or division coincident with the plane of symmetry indicated by the suture. The largest cross section of the pit is then exposed and its extraction is considerably facilitated. Since the suture gives an easily visible exterior indication of the position of the plane of symmetry, it is used as a guide for the proper positioning of the fruit in my machine.

An object of my invention is to provide a fruit pitting machine which will operate continuously to remove pits from fruit.

Another object of my invention is to provide a fruit pitting machine in which the fruit is bisected thru the plane of symmetry of the pit.

An additional object of my invention is to provide a fruit pitting machine in which a single pair of chain conveyors carry the fruit thru the machine.

A further object of my invention is to provide a fruit pitting machine in which the act of inserting the fruit into the machine causes the fruit to be resiliently gripped.

My invention possesses other advantageous features, some of which with the foregoing, will be set forth at length in the following description where I shall outline in full that form of the fruit pitting machine of my invention, which I have selected for illustration in the drawings accompanying and forming part of the present specification. In said drawings I have shown one form of the fruit pitting machine of my invention, but it is to be understood that I do not limit myself to such form since the invention, as set forth in the claims, may be embodied in a plurality of forms.

The fruit pitting machine of my invention preferably comprises a single pair of conveyors having means for gripping inserted fruit and carrying said friut to means for bisecting the fruit and to means for removing the pits from the portions of the bisected fruit.

I have provided means in my machine for dividing a whole peach into two portions and in order to divide the peach on a plane coincident with the plane of symmetry, I have provided members to receive the fruit with the suture thereof in a predetermined position with respect to the dividing means and to convey the fruit in the predetermined position to the dividing means. Preferably, a pair of conveyors are provided which extend for the full length of the machine and are the only conveyors which handle the fruit from its initial reception to its final discharge. Each conveyor comprises a plurality of links 6 connected by pairs of members 7 pivoted together vertically by pins 8 and pivoted to the links horizontally by pins 9. The links are thereby made capable of movement in two planes normal to each other and are capable of relative rotation in two directions. The conveyors extend around a pair of sprockets 11 mounted on a shaft 12 at one end of the machine and around a second pair of sprockets 13 mounted on a shaft 14 at the other end of the machine. The two shafts 12 and 14 are journalled in bearings 16 and 17 supported on the framework 18 of the machine. The bearings 17 are preferably made adjustable with respect to the frame in order that the proper tension can be exerted upon the two conveyors.

Intermediate the pairs of sprockets 11 and 13 and suitably suspended from the framework 18 are guides 19 which engage oppositely extending flanges 21 preferably formed integrally with the links 6. The motion of the links is constrained to follow the guides which are so disposed on the machine that the links of the two conveyors are symmetrical with respect to a central vertical plane indicated by the line 22. Adjacent the sprocket 11, the guides 19 are closely spaced to position the conveyors in substantially contiguous relationship.

A plurality of members are provided on the conveyors for receiving and holding fruit to be pitted. Each member preferably comprises two pairs of quadrants 23 and 24. One of the quadrants of the pair 23 is mounted on one of the links 6 of one conveyor while the other quadrant of the pair 23 is mounted on the corresponding link of the second conveyor. The two quadrants of the pair 24 are also mounted on corresponding links of the two conveyors. The four quadrants together are substantially of spherical form and are slightly relieved at their upper corners to facilitate the introduction of fruit. The quadrants are slightly spaced apart and are separated by a narrow gap coincident with the plane 22. The individual quadrants of pair 24 are preferably relatively translatable with respect to the individual quadrants of pair 23 and are therefore mounted on slides 26 each of which engages a pair of parallel rods 27 supported on the link 6. Since the slides can move relative to the links 6, they are movable asynchronously with respect to the synchronous motion of the conveyors. The rods preferably engage a boss 28 bridging one end of the link and pass thru a flange 29 upstanding at the other end of the link. The rods are pinned in place and carry spiral springs 31 which urge the quadrants 24 toward the quadrants 23.

It is intended that all of the fruit receiving members lying adjacent the sprocket 11 be retained in open position with the quadrants of the pairs 23 widely spaced from the quadrants of the pairs 24. This is the fruit receiving position of the members and the region adjacent the sprockets 11 on the upper runs of the conveyors is termed the receiving station.

In order to keep the quadrants of the pairs 23 and 24 in spaced, open position, before they receive fruit at the receiving station, a latching mechanism is provided. The latch is arranged to be tripped upon the insertion of a fruit between the quadrants of the pair 23 and those of the pair 24 so that the inserted fruit will be resiliently gripped. Upon the outer end of each slide 26, a projecting lug 32 is formed which is adapted to be engaged by the notched end of a lever 33. The lever is pinned to one end of a shaft 34 extended thru and rotatable in the boss 28. At the opposite end of the shaft 34, one of the quadrants of pair 23 is mounted to rotate with the shaft. A coil spring 35 is interposed between the quadrant and the boss 28 and urges the notched lever 33 toward engagement with the lug 32. When the quadrants of pair 24 are in open position with the coil springs 31 compressed, the coil springs 35 urge the notched levers 33 to engage the lugs 32 and maintain the two pairs of quadrants in open or fruit receiving position.

When a peach to be pitted is placed between the four open quadrants 23 and 24, it is turned manually so that the stem end of the fruit points in the intended direction of motion of the conveyor and so that the suture 36 is uppermost, preferably, and lies within the gap between the individual quadrants of the two pairs; that is, with the suture and the plane of symmetry of the fruit and pit coinciding with the plane of symmetry of the pitting machine. The fruit is pressed against the pair of quadrants 23 and is seated with projections 37 on the quadrants resting within the stem end depression of the fruit and aiding to position the fruit correctly. Upon the exertion of pressure against the pair of quadrants 23, they are rotated a slight amount about the axes of shafts 34 and lift the notched levers 33 out of engagement with the lugs 32. The springs 31 are then free to press the pair of quadrants 24 toward the pair 23 and grip the fruit resiliently. Preferably, the slides 26 are rather a loose fit on the rods 27, and as soon as the quadrants 24 have engaged the fruit, the slides bind slightly upon the rods and tend to prevent unwarranted return movement of the quadrants of pair 24. A force acting in the manner of an expansive force between the quadrants of pairs 23 and 24 tends to rotate the quadrants 24 and lock the slides 26 upon the rods 27. The fruit is therefore resiliently but firmly held for the subsequent bisecting and pitting operations. To prevent excess rotational movement of the quadrants 23 about the axes of the shafts 34, fingers 38 are provided which engage abutments 39 on the links 6 and stop the quadrants 23 when they have rotated a few degrees.

Figure 1:
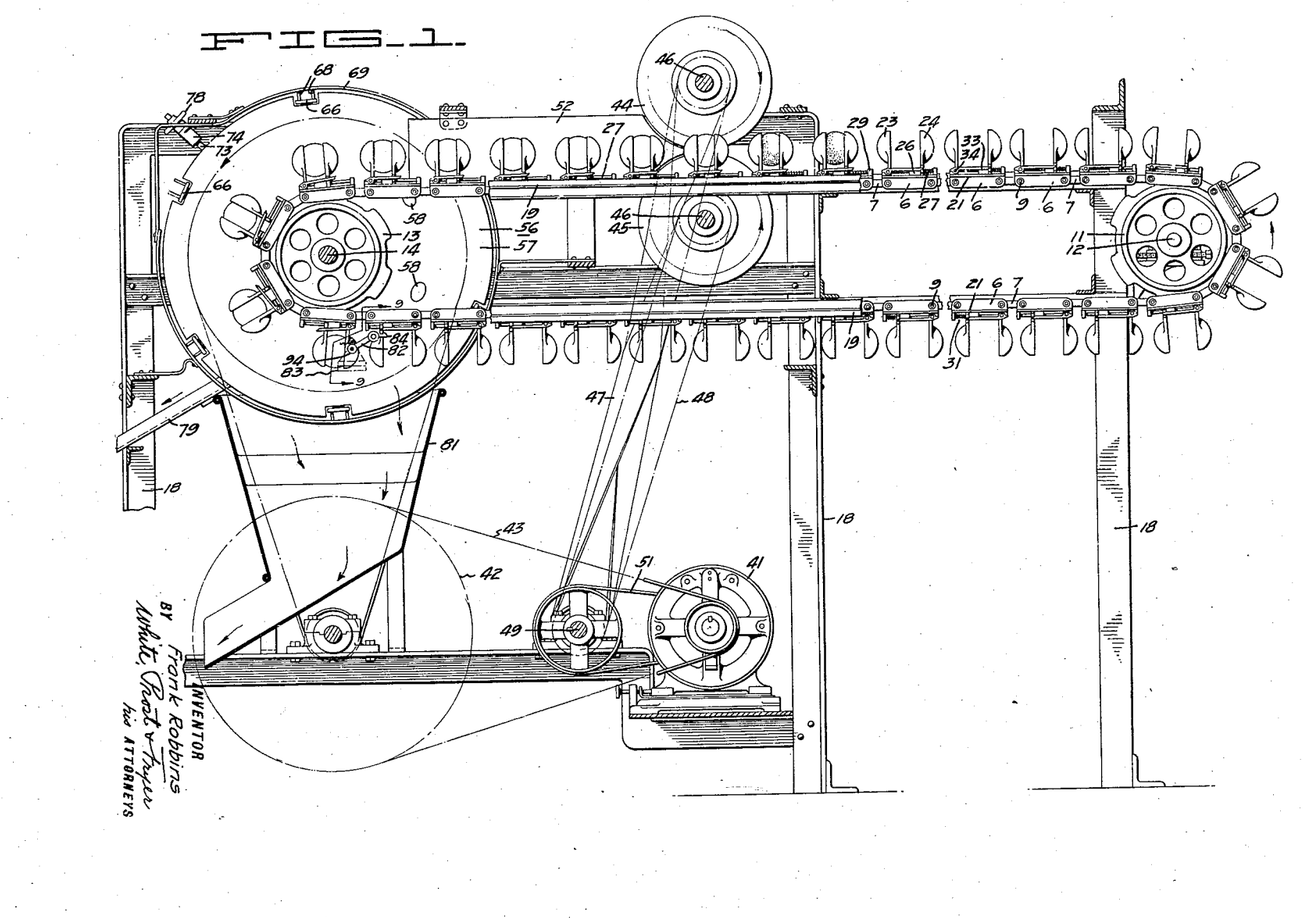
Fig. 1 is a longitudinal section of the machine of my invention, the plane of section being indicated by line 1—1 in Fig. 2.
Figure 2:
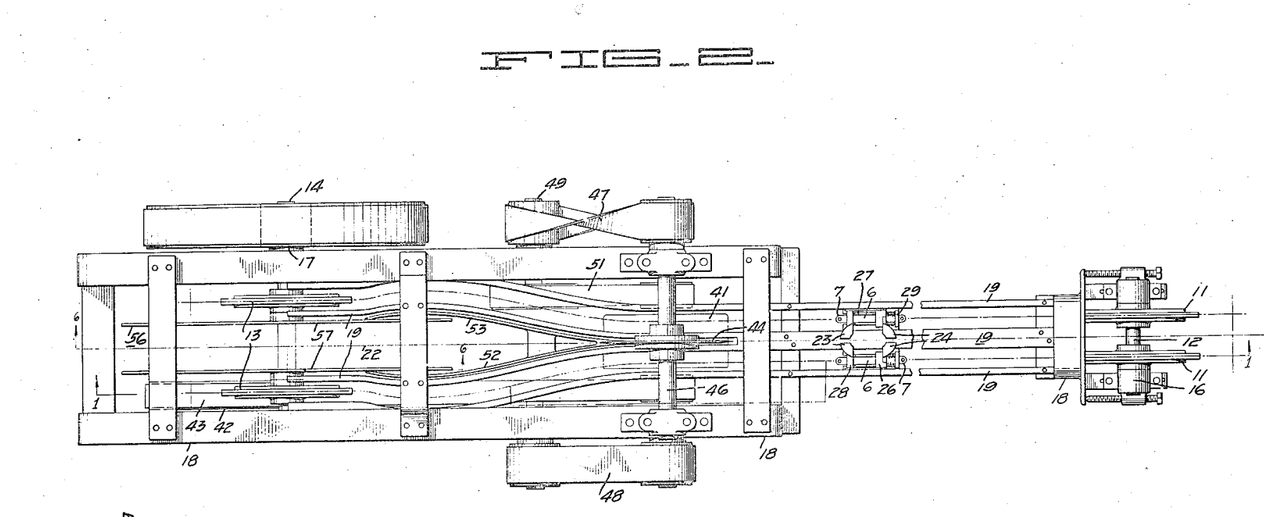
Fig. 2 is a plan of the machine shown in Fig. 1, various portions of the machine being omitted for greater clarity.

Means are provided for causing the conveyors to travel upon rotation of the pairs of sprockets 11 and 13. These means comprise teeth on the sprockets which engage the links between the members 7 and drive the conveyors. An electric motor 41 for rotating the sprockets is conveniently mounted on the frame 18 of the machine. The motor drives the sprockets thru pulleys 42 and belts 43 arranged to afford a speed reduction and to transmit the drive thru a pulley on the shaft 14. The direction of rotation of the shaft 14 is counterclockwise, as shown in Fig. 1, and the upper runs of the conveyors therefore move toward the left of the figure.

The two conveyors moving contiguously thru the receiving station approach means for bisecting the fruit. The bisecting means preferably comprise a pair of disc knives 44 and 45 which are mounted on parallel shafts 46 suitably journaled on the frame 18 of the machine. The disc knives are disposed with their peripheries substantially in contact, a very slight running clearance being allowed. The two disc knives are coplanar or substantially so, and are preferably disposed coincident with the plane of symmetry 22 of the machine and lie within the gap between the fruit receiving members on the pair of conveyors. The knives are preferably rotated at relatively high velocity and in opposite directions, as indicated by the arrows in Fig. 1, by means of a pair of belts 47 and 48 which engage pulleys at the ends of the shafts 46 and are turned about pulleys at the ends of a cross shaft 49 journalled on the machine frame 18. The cross shaft 49 is driven by a belt 51 connected to the electric motor 41.

Upon the energization of the electric motor 41, the pair of conveyors are advanced and the pair of disc knives are simultaneously rotated. Fruit placed in the predetermined position within the open fruit receiving members at the receiving station trips the latches and is resiliently gripped. The firmly held fruit is advanced toward the disc knives and is bisected by the rapidly revolving knives in a plane coincident or substantially coincident with the plane of symmetry of the pit, as indicated by the suture 36. Inasmuch as the location of the suture determines the initial position of the fruit within the receiving members and since the fruit is retained in the initial predetermined position by the pairs of quadrants 23 and 24, the fruit is divided on the plane of symmetry of the pit without regard to the exterior contour of the fruit.

From the disc knives the bisected fruit is advanced by the conveyors onto a pair of separator plates 52 and 53 which are symmetrically disposed at either side of the plane 22 of the machine and are bounded at their united forward ends by arcuate edges following the contour of the peripheries of the disc knives. The separator plates diverge gradually from the plane of symmetry of the machine which is the plane of the disc knives and separate the advancing portions of the bisected fruit. The guides 19 of the two conveyors diverge from contiguous relationship in amounts corresponding to the divergence of the separator plates 52 and 53 and constrain the conveyors to maintain the two portions of the fruit in contact with the separator plates.

Figure 3:
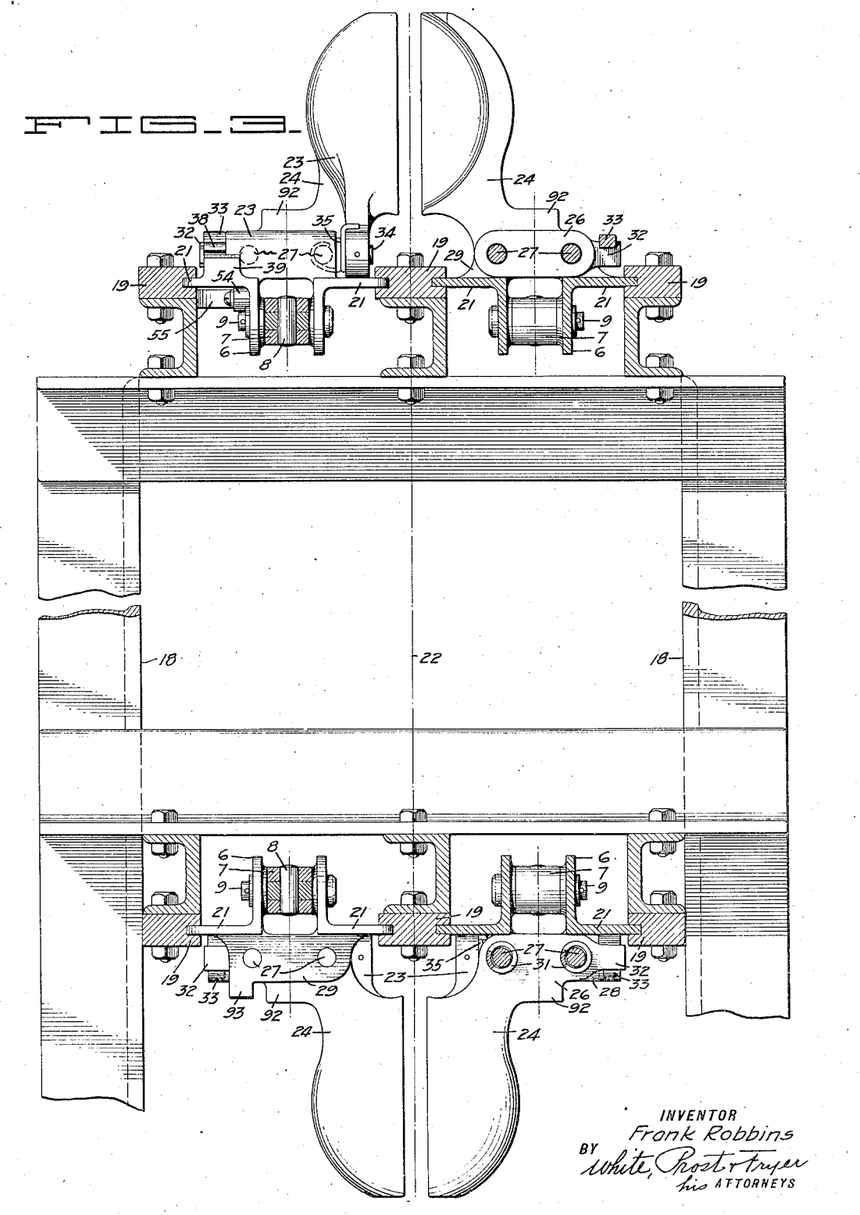
Fig. 3 is a transverse section of the machine, the plane of section being indicated by the line 3—3 of Fig. 5.
Figure 4:
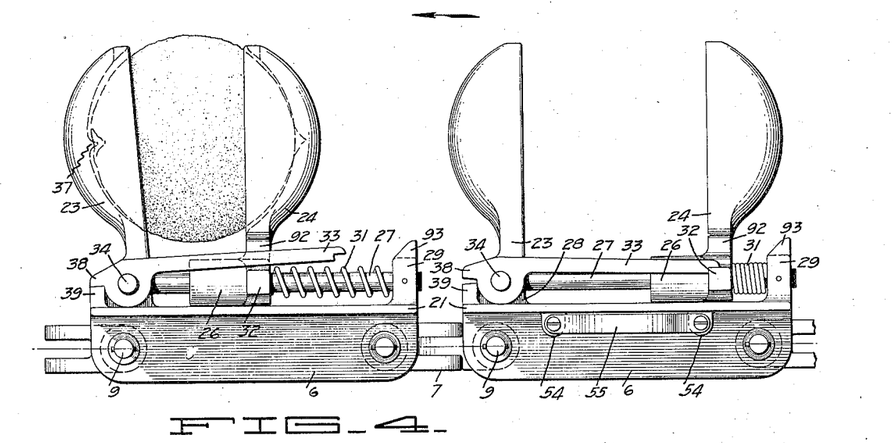
Fig. 4 is a side elevation of two consecutive links of one of the conveyors, the left hand link being shown in closed position, while the right hand link is shown in open position.
Figure 5:
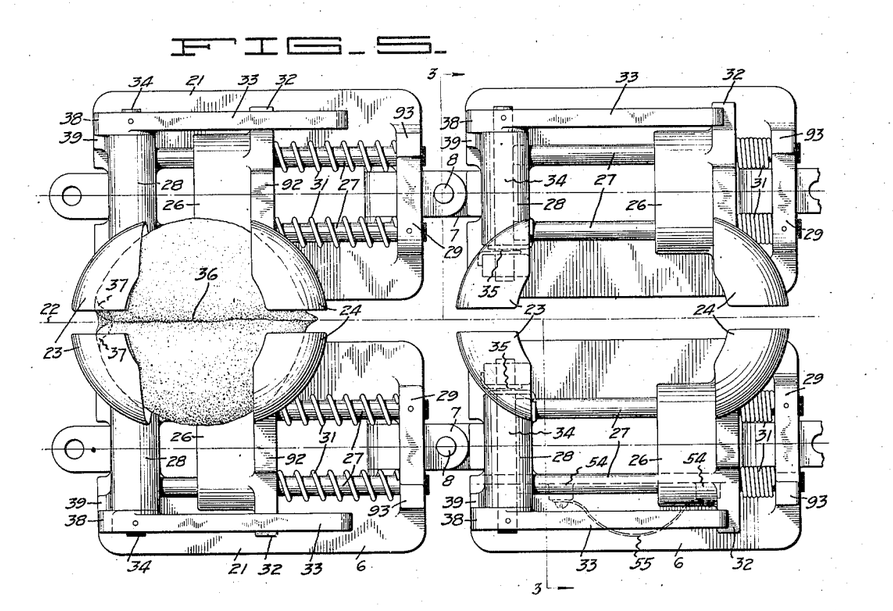
Fig. 5 is a plan of the two links of Fig. 4.
Figures 6, 7:
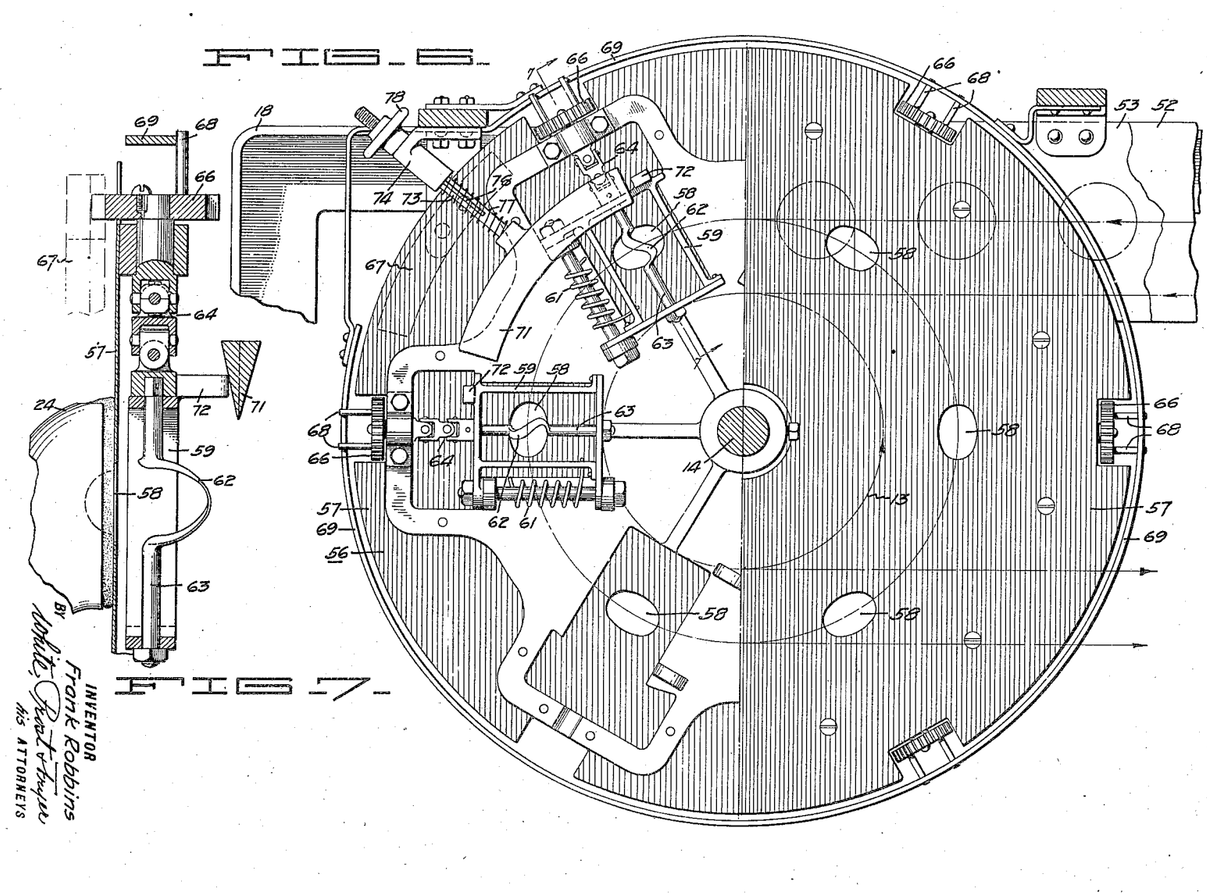
Fig. 6 is, on the left half, a cross section of the pitting wheel of the machine, the plane of section being indicated by the line 6—6 of Fig. 2, and on the right half is a side elevation of the pitting wheel.
Fig. 7 is a fragmentary view illustrating the mounting of the pitting knife, portions being shown in a section taken in a plane indicated by the line 7—7 of Fig. 6.
Figure 8:
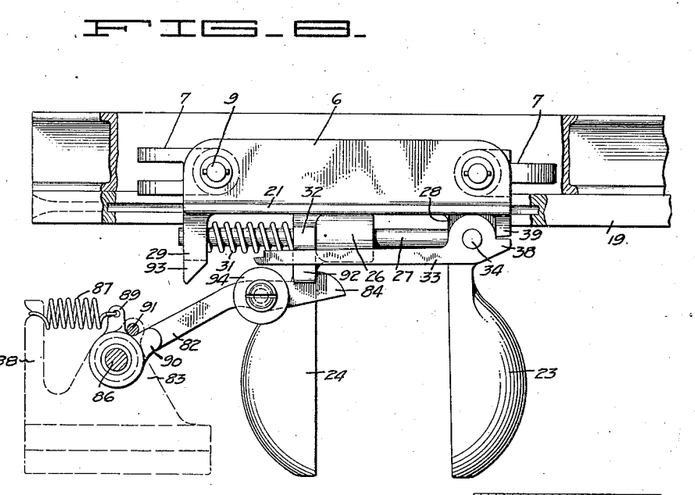
Fig. 8 is a side elevation of the cocking device for the gruit receiving members with portions of the framework of the machine broken away.
Figure 9:
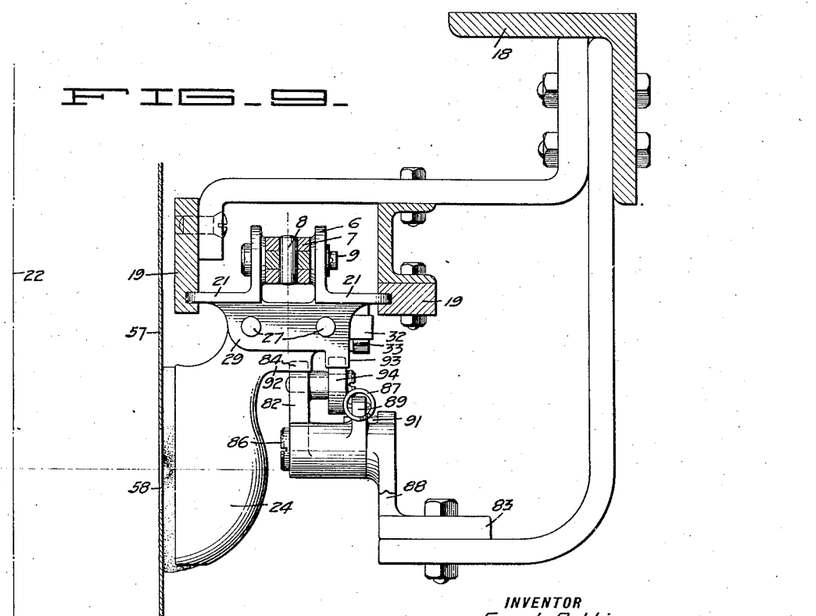
Fig. 9 is a cross section of a portion of the machine with the plane of section indicated by the line 9—9 of Fig. 1, and showing in end elevation the cocking mechanism of Fig. 8.

In order to insure that the portions of the bisected fruit are always maintained in close relationship with the separator plates, means are provided for resiliently pressing the fruit receiving members toward the separator plates. These means are optionally provided and are therefore illustrated on only one link. As shown in Figs. 3, 4 and 5, a pair of projections 54 are formed on the bottom of the outside flange 21 of the link 6 and carry a leaf spring 55 between them. The leaf spring is bowed outwardly to engage the guide 19 and counteract any play which exists between the guides or which would tend to permit the fruit receiving member to recede from the separator plate.

From the separator plates, the two portions of the bisected fruit are carried to means for removing the half-pits therefrom. The pitting means preferably comprises a wheel 56 mounted for rotation with the shaft 14 and symmetrically disposed with respect to the plane of symmetry of the machine. The separated ends of the separator plates converge slightly to form a smooth junction with the pitting wheel lying between them. The guides 19 are correspondingly curved. The wheel 56 preferably comprises a pair of spaced, parallel plane surfaces or discs 57 mounted coaxially with the shaft 14. On the surface of each disc, a plurality of apertures 58 are provided which are spaced and located to register with the successive half-pits contained in the portions of the bisected fruit advanced onto the discs by the movement of the corresponding conveyor.

Disposed between the two discs 57 are means for cutting the half-pits from each portion of the bisected fruit. A pivoted frame 59 journalled upon the structure of the wheel is provided in association with each aperture. A spring 61 urges the frame away from the associated plate 57. Mounted for rotation within the frame 59 is a cutting or pitting knife 62 of the type disclosed in the application of Henry Johnson, Serial No. 133,157 copending with this application and now having matured into a patent No. 1,671,587. The knife is provided with an axle 63 journalled within the frame 59 and extending radially from the shaft 14.

In order to rotate the knife 62 when a portion of a bisected peach to be pitted is in registry with the aperture 58, the axle 63 is connected thru a universal joint 64 with a pinion 66 journalled on the wheel 56. The universal joint 64 permits misalinement between the axis of rotation of the pinion and the axis of rotation of the axle consequent upon the movement of the frame 59 with respect to the plate 57. The pinion 66 during the rotation of the wheel 56 engages a gear sector 67 suitably mounted upon the framework 18 of the machine. The length of the gear sector is such that it rotates the pinion thru a cycle of one complete revolution, sufficient to cut the half-pit from a portion of a bisected peach. To insure that the knife 62 is always in initial cutting position when a cut is started, and also to prevent it projecting thru the aperture 58 prior to the registration of a peach portion therewith, a pair of pins 68 are provided on the pinion 66. The pins are located to one side of a diameter of the pinion and extend outwardly to engage a ring 69 disposed circumferentially about the wheel 56. Adjacent the gear sector 67, the ring is interrupted, and the pins 68 do not constrain the pinion and knife from turning. As soon as the pinion revolves once it leaves the segment 67, and the pins 68 again come into engagement with the ring 69 and maintain the knife 62 in initial, starting position until it again returns to pitting position.

The adjustable mounting of the knife on the frame 59 permits cuts of varying depth and size to be made as the knife can be projected thru the aperture 58 a slight amount or an amount to take a deep cut. The spring 61 biases the knife to take a shallow cut and in order to increase the depth of the cut, I have provided regulating means for spacing the frame 59 closer to the plate 57 and causing the knife to project farther thru the aperture 58. An arcuate wedge 71 is situated in the path of a lug 72 on each frame 59 and is provided with a flaring engaging edge and radially diverging cross section. The wedge is mounted on a stem 73 extending thru a journal 74 on the frame 18 and is prevented from rotating by a key 76 engaging a keyway, not shown. The wedge normally is urged radially toward the shaft 14 by a coil spring 77 surrounding the stem 73. A hand wheel 78 engages the upper threaded end of the stem and provides means for withdrawing radially the arcuate wedge in any desired amount, thereby controlling the spacing of the frames 59 from the discs 57 and regulating the depth of the cuts taken by the knives.

Continued advancement of the conveyor causes the fruit receiving members to rotate synchronously with the rotation of the wheel 56 as the half-pits are removed from the portions of the bisected fruit and are drawn to the interior of the wheel by the knives. The removed pits fall into a chute 79 mounted on the frame of the machine and extending to a suitable receptacle. When the fruit receiving members approach bottom center position on the wheel 56 they re-engage the guides 19 and leave the wheel, discharging the pitted peach portions they contain into a hopper 81 leading to a container at the side of the machine, not shown.

In order to insure the release of the pitted peach portions from the fruit receiving members, and also in order to return the quadrants of each pair 24 to fruit receiving or open position, I have provided a cocking means for re-setting the latching mechanism comprising the levers 33. A cocking device is located on each side of the machine and includes a lever 82 suitably pivoted on a bracket 83 extending from the frame 18 of the machine and provided at its end with a hook 84. The lever is urged to rotate about its pivotal point 86 by a spring 87 engaging a projection 88 on the bracket 83 and also engaging an arm 89 integral with the lever 82. Between the arm 89 and a lug 90, a pin 91 is situated which acts as a limit stop for rotational movement of the lever in either direction. The spring 87 urges the hook 84 to stand in the path of projections 92 upstanding from the slides 26.

As the conveyor advances, one of the projections 92 engages the hook 84 and the corresponding slide 26 is drawn relative to the associated link 6 toward open position with the simultaneous compression of the coil springs 31. When the lug 32 overlies the notch in the end of the lever 33, the coil spring 35 urges the notched end of the lever 33 into engagement with the lug. The pair of quadrants 24 are returned to open position and are retained by their respective latches. Simultaneously with the latching of each of the quadrants 24, a cam 93 upstanding from the flange 29 engages a roller 94 mounted on the lever 82 and forces the hook 84 from engagement with the projection 92. The spring 87 returns the hook 84 to a position in the path of the projection 92 on the succeeding link 6 and the cocking process is repeated for each fruit receiving member. Inasmuch as the hook 84 engages the projection 92 close to the slide 26, the binding action of the slide upon the rods 27 is not appreciable and the pair of quadrants 24 are returned easily to open or fruit receiving position. Further movement of the conveyors returns the fruit receiving members about the pair of sprockets 11 to their relatively contiguous position in the fruit receiving station, from which the cycle of operations of the machine can be repeated indefinitely.

I claim:

1. A fruit pitting machine comprising means for bisecting a fruit and its contained pit, means for pitting bisected fruit, a chain conveyor for carrying fruit to said bisecting means and said pitting means from a receiving station, and means on said conveyor for receiving and holding fruit against lateral displacement and with the suture of said fruit in a predetermined position with respect to said bisecting means, whereby the fruit is maintained with its suture coincident with the longitudinal axis of the machine irrespective of the varying contours of the fruit placed therein.

2. A fruit pitting machine comprising means for bisecting a fruit and its contained pit, means for pitting bisected fruit, a conveyor for carrying fruit to said bisecting means and said pitting means from a receiving station, and means for receiving fruit with the suture of said fruit in a predetermined position at said receiving station and maintaining the suture of said fruit in said position and against lateral displacement as said fruit is carried by said conveyor, whereby the fruit is maintained with its suture coincident with the longitudinal axis of the machine irrespective of the varying contours of the fruit placed therein.

3. A fruit pitting machine comprising a pair of chain conveyors, a fruit receiving member mounted on one of said conveyors, a cooperating fruit receiving member mounted on the other of said conveyors, and means permitting relative motion between said members and said conveyors in the direction of motion of said conveyors.

4. A fruit pitting machine comprising a pair of chain conveyors, a pair of fruit receiving quadrants on one of said conveyors, a cooperating pair of fruit receiving quadrants on the other of said conveyors, and means for permitting relative movement between the quadrants of said pairs.

5. A fruit pitting machine comprising a pair of chain conveyors, a pair of fruit receiving quadrants on one of said conveyors, a cooperating pair of fruit receiving quadrants on the other of said conveyors, and means permitting relative movement between said quadrants in a direction substantially parallel to the direction of motion of said conveyors and in a direction substantially normal to the direction of motion of said conveyors.

6. A fruit pitting machine comprising a chain conveyor flexible in two directions normal to each other, and a fruit receiving member on said conveyor and movable with respect to said conveyor in a direction normal to said two directions.

7. A fruit pitting machine comprising a chain conveyor having hinged links relatively movable in two planes, and a fruit receiving member mounted on one of said links for limited translatory movement.

8. A fruit pitting machine comprising a chain conveyor having links relatively movable in two planes, guides for constraining the movement of said links in one of said planes, and sprockets for constraining the rotation of said links in the other of said planes.

9. A fruit pitting machine comprising a pair of chain conveyors the links of which are flexible in two planes, means for advancing said conveyors thru a receiving station and guides for constraining said links against relative movement in said receiving station, and means for flexing said links in both of said planes.

10. A fruit pitting machine for fruit having a stem-end depression therein comprising a fruit receiving member, and a pair of cooperating projections on said member adapted to seat in said depression.

11. A fruit pitting machine for fruit having a suture and a stem-end depression comprising a substantially spherical fruit receiving member separated on two planes normal to each other, and means on said member substantially in one of said planes adapted to seat in said depression to aid in locating said fruit with said suture coincident with one of said planes.

12. A fruit pitting machine comprising a fruit receiving member including two relatively translatable quadrants, and means operated by substantial rotational movement of one of said quadrants for restraining the relative translatory movement of said quadrants.

13. A fruit pitting machine comprising a fruit receiving member including a link, a quadrant constrained against translation on said link, a second quadrant mounted to slide on said link, and means responsive to an expansive force between said quadrants for restraining the translatory movement of said second quadrant.

14. A fruit pitting machine comprising a fruit receiving member adapted to lie in open position or in closed position, a spring for urging said member toward closed position, a latch for holding said member in open position, and means actuated by the positioning of fruit in said member for tripping said latch.

15. A fruit pitting machine for use with fruit having a suture comprising a pair of conveyors disposed symmetrically with respect to a central plane, means on said conveyors for receiving said fruit with said suture coincident with said plane, means for holding said fruit in received position and against lateral displacement out of said plane, means coincident with said plane for bisecting said fruit, means symmetrically disposed with respect to said plane for separating the portions of said bisected fruit, and means for pitting said portions.

16. A fruit pitting machine for use with fruit having a suture comprising a pair of conveyors disposed symmetrically with respect to a central plane, means on said conveyors for receiving said fruit directly from an operator and with said suture coincident with said plane, means for holding said fruit in received position, means coincident with said plane for bisecting said fruit, a pair of separator plates diverging from said plane in the path of said conveyors, and means for pitting the bisected fruit beyond said plates in the path of said conveyors.

17. A fruit pitting machine for use with fruit having a suture comprising a pair of contiguous chain conveyors, means on said conveyors for initially receiving fruit with said suture in a predetermined position, means for holding said fruit in received position, means for bisecting said fruit coincident with said suture, means for separating the portions of said bisected fruit, means for correspondingly separating said conveyors, and means between said separated conveyors for pitting said bisected portions.

18. A fruit pitting machine comprising a pair of sprockets, a chain conveyor engaging said sprockets, a plurality of fruit receiving members spaced on said conveyor, and a disc coaxial with one of said sprockets and adapted to rotate in time with said conveyor, said disc having apertures therein adapted to register with said fruit receiving means.

19. A fruit pitting machine comprising a pair of sprockets, a chain conveyor engaging said sprockets, a plurality of fruit receiving members spaced on said conveyor, a wheel adapted to rotate in time with said conveyor, and a plurality of fruit pitting knives rotatably mounted on said wheel and adapted to register with said fruit receiving means.

20. A fruit pitting machine comprising a pair of sprockets, a chain conveyor engaging said sprockets, a plurality of fruit receiving members spaced on said conveyor, a wheel adapted to rotate in time with said conveyor, a plurality of fruit pitting knives movably mounted on said wheel adapted to register with said fruit receiving means, and means for moving said knives with respect to said wheel when said knives are in registry with said fruit receiving means.

21. A fruit pitting machine comprising a pair of sprockets, a chain conveyor engaging said sprockets, a plurality of fruit receiving members spaced on said conveyor, a wheel mounted coaxially with one of said sprockets and adapted to rotate in time therewith, a disc on said wheel having apertures therein adapted to register with said fruit receiving means, a plurality of fruit pitting knives adapted to operate thru said apertures, and means for operating said knives when said apertures and said fruit receiving means are in registry.

22. A fruit pitting machine comprising a shaft, a rotatable disc mounted on said shaft, said disc having apertures therein, a plurality of fruit pitting knives adapted to work thru said apertures, axles for said knives disposed radially of said disc, journals for said axles adjustably movable with respect to said disc, means for driving said axles, and means for adjustably moving said journals.

23. A fruit pitting machine comprising a shaft, a rotatable disc mounted on said shaft, said disc having apertures therein, a plurality of fruit pitting knives adapted to work thru said apertures, axles for said knives disposed radially of said disc, driving means for rotating said axles, and means for preventing rotation of said axles during a predetermined amount of rotation of said discs.

24. A fruit pitting machine comprising a frame, means for receiving directly from an operator fruit having its suture in a predetermined lateral relationship to said frame, said means including members cooperatively connected for manual operation and adapted for grasping the fruit after its insertion therein by the operator, means on said frame for longitudinally advancing said received fruit with said suture in said predetermined lateral relationship to said frame, and means on said frame for bisecting said fruit on a longitudinal plane having a predetermined lateral relationship to said frame and which is the plane of said suture.

25. A fruit pitting machine comprising a frame, means for receiving directly from an operator and laterally holding in received relationship fruit having its suture in a predetermined lateral relationship to said frame, said means including members cooperatively connected for manual operation and adapted for grasping the fruit after its insertion therein by the operator, means for longitudinally advancing said received fruit with said suture in said predetermined lateral relationship, and means for bisecting said fruit on a longitudinal plane having a predetermined lateral relationship to said frame and which is the plane of said suture.

26. A fruit pitting machine comprising a frame, means for receiving at a receiving station and directly from an operator fruit having its suture in a predetermined lateral relationship to said frame, said means including members cooperatively connected for manual operation and adapted for grasping the fruit after its insertion therein by the operator, means for bisecting said fruit on a longitudinal plane having a predetermined lateral relationship to said frame and which is the plane of said suture, and means for advancing said fruit with said suture in said predetermined lateral relationship from said receiving station directly to said bisecting means.

27. A fruit pitting machine comprising a frame, means for receiving directly from an operator fruit having its suture in a predetermined lateral relationship to said frame and for grasping said fruit after its insertion therein in response to the manual effort of the operator in placing the fruit therein, means on said frame for longitudinally advancing said received fruit with said suture in said predetermined lateral relationship to said frame, and means on said frame for bisecting said fruit on a longitudinal plane having a predetermined lateral relationship to said frame and which is the plane of said suture.

28. A fruit pitting machine for use with fruit having a suture comprising means for bisecting fruit, means for pitting bisected fruit, means for effecting advance of said fruit from a receiving station to said bisecting means and to said pitting means, and means for receiving fruit with the suture thereof in a predetermined position and maintaining said suture in said position during said advance of said fruit.

29. A fruit pitting machine for use with fruit having a suture comprising means for pitting fruit, means for effecting advance of said fruit from a receiving station to said pitting means, and means for receiving fruit with the suture thereof in a predetermined position and maintaining said suture in said position during said advance of said fruit.

30. A fruit pitting machine having a central plane and for use with fruit having a suture comprising means for effecting advance of said fruit along said central plane, and means for receiving fruit with the suture thereof in said plane and maintaining said suture in said plane during said advance of said fruit.

In testimony whereof, I have hereunto set my hand.

FRANK ROBBINS.